Figure 1:
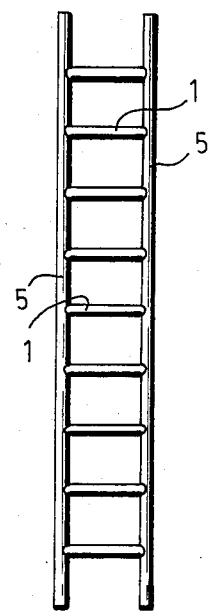

United States Patent [19]

Karo

[11] Patent Number: 4,634,487
[45] Date of Patent: Jan. 6, 1987

[54] METHOD OF PRODUCING SCAFFOLDS

[75] Inventor: Jorma H. Karo, Helsinki, Finland

[73] Assignee: Karolon Oy, Helsinki, Finland

[21] Appl. No.: 703,308

[22] Filed: Feb. 20, 1985

[30] Foreign Application Priority Data

Mar. 13, 1984 [FI] Finland ................................ 841003

[51] Int. Cl.⁴ ........................................... B32B 31/04
[52] U.S. Cl. .................................... 156/256; 156/293;
156/295; 156/296; 182/46; 182/228
[58] Field of Search ............... 156/258, 293, 294, 295,
156/296, 304.2, 306.9, 307.3, 256; 182/46, 228

[56] References Cited

U.S. PATENT DOCUMENTS 3,158,224 11/1964 Van Name et al. .................. 182/46
3,225,862 12/1965 Fink ....................................... 182/46
3,674,110 7/1972 Cooke .................................... 182/46

FOREIGN PATENT DOCUMENTS 1202036 1/1960 France ................................. 182/46

Primary Examiner—Caleb Weston
Attorney, Agent, or Firm—Ladas & Parry

[57] ABSTRACT

The invention relates to a method of producing scaffolds, especially ladders. In order to provide a construction solely made of an insulant material, the rails (5) and the rungs (1) of a ladder according to the invention are wholly made of reinforced plastic and are joined to each other by means of a polymeric cold junction method. Thereby a hole (18) is provided on the side of the rail (5) and a suitable amount of a mineral or fiber reinforced monomer mixture (2) is added therein, whereafter the rung (1) is positioned thereto and the resultant whole is turned upside down, the monomer mixture being polymerized by means of heat, a catalyst and/or an accelerator. So the monomer mixture flows around the junction of the rung (1) and the rail (5), polymerizing therein and forming a tight joint between the rung and the rail.

7 Claims, 4 Drawing Figures

U.S. Patent  Jan. 6, 1987  4,634,487

METHOD OF PRODUCING SCAFFOLDS

At the same time as data processors and the like have become more common, the importance of the quality and uninterrupted supply of electric current has been further emphasized. On account of this, there is a tendency to perform installations and repairs with the current on, which, in fact, is possible in a low voltage network, provided that the electrician is insulated from the ground. This is best effected in such a manner that the installation is carried out on a ladder made of an insulating material, such as plastic.

So the invention relates to a method of producing scaffolds, especially ladders, rails and rungs of which are made of a hollow tube or profile of reinforced plastic, in which method holes are drilled into the rails for insertion of the ends of the rungs. Methods of producing ladders of plastic material for a corresponding purpose are known e.g. from U.S. Pat. Nos. 3,158,224 and 3,225,862 and British Pat. Specification No. 923,788 and French Pat. Specification No. 2,040,536. However, in the ladders according to said publications, profiles filled with cellular plastic are used both for the rails and the rungs of the ladder. Consequently, maintaining the glue in place in a cavity drilled into the rail does not cause any problems during the glueing phase. Although it is simple to produce ladders using profiles filled with cellular plastic, making of said profiles filled with cellular plastic adds an extra stage into the production of ladders. In addition, U.S. Pat. No. 3,674,110 discloses a method of producing a ladder using hollow plastic profiles both as the rails and the rungs of the ladder. In the method described in said publication, the agent used in glueing the rungs is first applied to the edges of the aperture drilled into one side surface of the rail, wherefrom said agent, when the rung is pushed into place, is partly carried within the rail, thereby glueing both side surfaces of the rail to the rung. This glueing method, however, has the problem that the amount of glue carried within the rail by means of the method remains rather small, on account of which also the glueing remains unreliable. In this type of glueing, the axial tension exerted on the rung is mainly counteracted by the glue joint between the end of the rung and the inner surface of the rail and also by the small fillet of glue formed around the junction of the inner surface of the rail and the rung.

The object of the present invention is, accordingly, to provide a method of producing a plastic ladder, in which method the problems of the afore-described methods are avoided and a ladder is achieved which is simple to produce and rigid in construction. This has been effected by means of the method according to the invention, which is characterized in that (a) a batch of a polymerizable monomer mixture is fed through the holes drilled into one rail of the ladder on the inner surface of the rail opposite to the hole, (b) the ends of the rungs are inserted into the holes, (c) the rail with the rungs thereof is turned upside down so that the rail is positioned above the rungs, whereby the polymerizable monomer mixture flows downwards, forming a collar on the inner surface of the rail around the junction of the rung and the rail, (d) the monomer mixture is polymerized by means of heat, a catalyst and/or an accelerator, and (e) steps (a)–(d) are repeated so as to fasten the other rail of the ladder on the rungs.

In order to ensure that the polymerizable monomer mixture is properly positioned around the junction of the rail and the rung, it is advantageous that the monomer mixture is applied through the holes of the rails either as ring-shaped batches or, especially if this is not possible due to the viscosity of the mixture, it is used cups of e.g. paper material, which are positioned inside the rails, batches of the monomer mixture being placed in said cups. In order to further strengthen the joint, it is possible to provide the ends of the rungs with transverse holes positioned adjacent the junction of the rail and the rung, into which holes the monomer mixture flows, thus strengthening the resultant joint.

In order to achieve the proper viscosity of the polymerizable monomer mixture, it is advantageous to add therein a filling agent of mineral or fiber material. The used monomer can consist of e.g. phenolic formadehyde, polyol-acid or acid-anhydride polyester, styrene, vinyl ester, epoxy resin, acryl, methyl-methacrylate, urethane, melamine-formaldehyde, or mixtures thereof.

Figure 2:
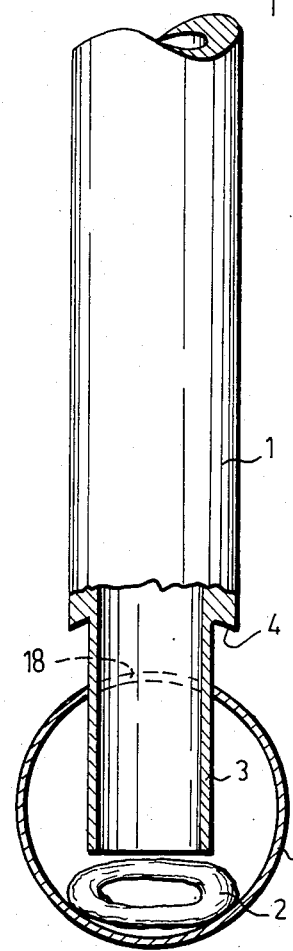
Figure 3:
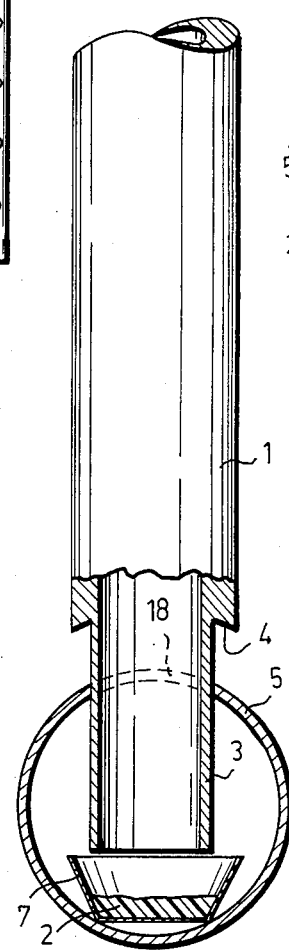
Figure 4:
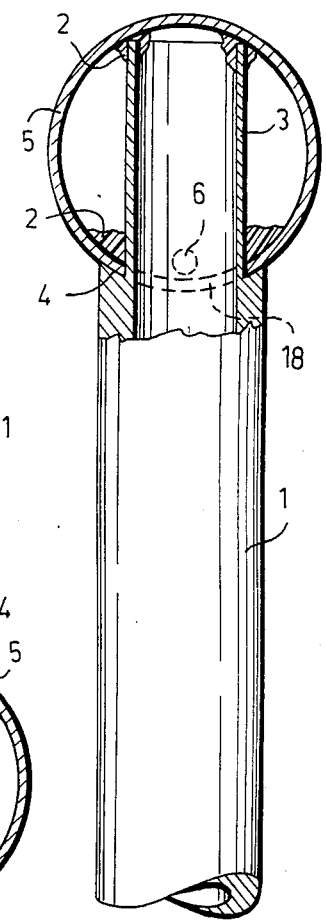

In the following the method according to the invention will be described in more detail with reference to the attached drawings, wherein, FIG. 1 illustrates a ladder produced in accordance with the invention, FIG. 2 illustrates one way of effecting the method according to the invention, FIG. 3 illustrates another way of effecting the method according to the invention, and FIG. 4 illustrates the junction of the rail and the rung in a ladder produced according to the invention.

FIG. 1 illustrates a ladder produced by means of the method according to the invention, which ladder mainly resembles a conventional ladder, comprising side rails 5 and rungs 1.

FIG. 2 illustrates one way of joining the rungs 1 to the side rails 5 in accordance with the invention. A hole 18 for the rung 1 is drilled into the rail 5, which is formed by a hollow tube of reinforced plastic. Although the rail 5 is illustrated to have a circular cross-section, it is to be understood that the method according to the invention is suitable to be used with side rails of almost arbitrary cross-section. The rung 1 to be glued in the rail 5 is also formed by a hollow tube or profile of reinforced plastic, whereby an end 3 of said rung, which end is inserted into said rail 5, is narrower than the rest of the rung 1. A shoulder 4 is thereby formed at the junction of the narrower portion 3 and the proper rung 1. It is to be mentioned that the cross-section of the rung 1 does not, either, have any essential importance with respect to effecting of the method according to the invention, if only the shape of the hole 18 drilled into the rail 5 corresponds to the shape of the end 3 of the rung. So one rung can comprise one or more tenons corresponding to the end portion 3 illustrated in the figure. This comes into question especially if the cross-section of the rung has the shape of a right-angled parallelogram and is relatively broad, whereby it is advantageous to position said tenons on both sides of the rung.

As appears from FIG. 2, a batch 2 of the polymerizable monomer mixture intended for glueing of the rung 1 is fed inside the rail 5 essentially in the form of a ring the shape of which corresponds to the cross-sectional shape of the tenon or tenons. The shape of the batch 2 as such is not particularly important, but the ring-shape is advantageous in that the required amount of glue is as small as possible. So also a conventional semi-spherical or flattened pancake-like shape would well be possible.

All said batch shapes, however, require that the viscosity of the used polymerizable monomer mixture is sufficient to maintain said shape during a required period of time, when the rung 1 is inserted into the rail 5.

If the viscosity of the used polymerizable monomer mixture is so low that the batch shapes of the type described above cannot be used, FIG. 3 illustrates one way suitable to be used in such cases. In the process according to FIG. 3, a cup 7 made of e.g. a paper material is placed inside the rail through the hole 18 drilled into said rail 5, a batch of said monomer mixture 2 being placed in said cup.

When the end 3 of the rung 1 is wholly pushed inside the rail 5, the end of the rung 1 is preferably brought into contact with the opposite inner surface of the rail 5. The next step in the method according to the invention is to turn the rail 5 with the rungs 1 inserted therein upside down into a position shown in FIG. 4 and to pass it into an oven of suitable temperature. The polymerizable monomer mixture 2 is thereby polymerized under the influence of the accelerator and/or catalyst included therein and the heat, though it is first fluidized to some extent. Thus most of the monomer mixture 2 flows along the end portion 3 of the rung 1 downwards around the junction of the rung 1 and the rail 5, forming therein a glue collar of the type illustrated in FIG. 4. After the polymerization of the monomer mixture, said collar provides an extremely tight axial glue joint of the rung 1 to the rail 5. Besides, one end of the rung 1 is joined to the opposite inner surface of the rail 5 by means of the same polymer mixture. For further strengthening of said glue joint, transverse holes 6 can be formed at the ends 3 of the rungs 1 adjacent the junction of the rail and the rung, into which holes the monomer mixture partially flows, thereby strengthening the resultant joint. Forming of such holes 6 cannot, however, be considered to be in any way indispensable.

Because the rungs 1 are formed by hollow plastic tubes or profiles, the monomer mixture 2 flows partly inside said tubes, too, when the rail 5 with the attached rungs is turned upside down. This has no disadvantageous effects but, on the contrary, improves joining of the end of the rung to the inner surface of the rail 5. It is, however, possible to alter the ratio of the monomer mixture 2 flowing on the inner and the outer side of the rung 1 by making that portion of the end 3 of the rung 1 which is inserted into the rail 5 at least partly conical. It is thus ensured that most of the monomer mixture flows around the junction of the rung 1 and the rail 5.

Joining of only one rail 5 and the rungs 1 to be attached thereto has been described above. It is, however, to be understood that the rail to be connected to the other ends of the rungs 1 can be joined in a fully corresponding manner, which results in a ladder of the type shown in FIG. 1.

The method of producing a ladder according to the invention has been described above only by means of some exemplary embodiments, and it is to be understood that it is possible to use various, mutually differing combinations of the above alternatives without, however, deviating from the scope of protection defined in the accompanying claims.

I claim:

1. A method of manufacturing scaffolds having rails and rungs made of hollow tubes and profiles of reinforced plastic, said method comprising the following steps:
   (a) drilling a plurality of holes within said rails for insertion of ends of the rungs;
   (b) placing a batch of a polymerizable monomer mixture on the inner surface of the rail oppositely to the hole through each of the holes drilled in the rail;
   (c) inserting ends of the rungs into the holes;
   (d) turning the rail together with the rungs upside down so that the rail is positioned above the rungs, whereby the polymerizable monomer mixture flows downwardly, forming a collar on the inner surface of the rail around a junction of the rung and the rail;
   (e) polymerizing the monomer mixture by means of heat, a catalyst and an accelerator, and
   (f) repeating steps (a)-(e) for other rails of the scaffold so as to fasten said other rails on the rungs.

2. A method according to claim 1 wherein the polymerizable monomer mixture is placed through the holes of the rails in the form of ring-shaped batches.

3. A method according to claim 1 further comprising the step of positioning cups on the inner surface of the rails through the holes, whereby said polymerizable monomer is applied in said cups.

4. A method according to claim 1 further comprising the step of providing the ends of the rungs with transverse holes positioned adjacent the junction of the rail and the rung, said monomer mixture flows into said holes strengthening a resulting joint.

5. A method according to claim 1 further comprising the step of adding a filling agent of mineral fiber and fiber material into said polymerizable monomer mixture to control the viscosity thereof.

6. A method according to claim 1 further comprising the step of making portions of the ends of the rung inserted into the rail having at least partially conical configuration.

7. A method according to claim 1 wherein said scaffold is a ladder.

* * * * *